United States Patent [19]
Ergun

[11] Patent Number: 4,463,974
[45] Date of Patent: Aug. 7, 1984

[54] COUPLING WITH IMPROVED TUBE-GRIPPING MEMBER

[75] Inventor: Joseph Ergun, Itasca, Ill.

[73] Assignee: Maremont Corporation, Carol Stream, Ill.

[21] Appl. No.: 201,158

[22] Filed: Oct. 27, 1980

[51] Int. Cl.³ .............................................. F16L 21/06
[52] U.S. Cl. .................................... 285/323; 285/174; 285/342; 285/348; 285/351; 285/354; 267/64.28
[58] Field of Search .............. 285/322, 323, 342, 343, 285/104, 105, 348, 174, 354, 423, 382.7, 238, 351; 188/322.21; 267/64.28

[56] References Cited

U.S. PATENT DOCUMENTS

| | | | |
|---|---|---|---|
| 2,330,841 | 10/1943 | Parker | 285/342 X |
| 2,727,763 | 12/1955 | Ziep | 285/342 |
| 2,862,732 | 12/1958 | Guillou | 285/342 |
| 3,173,671 | 3/1965 | Broadwell | 267/64 |
| 3,193,310 | 7/1965 | Hildner | 285/27 |
| 3,265,412 | 8/1966 | Reid et al. | 285/323 |
| 3,674,290 | 7/1972 | McNally | 285/248 |
| 3,817,561 | 6/1974 | Kay | 285/238 X |
| 3,895,832 | 7/1975 | Ellis et al. | 285/322 |
| 4,154,465 | 5/1979 | Van Meter | 285/323 |
| 4,229,025 | 10/1980 | Volgstadt | 285/105 |

FOREIGN PATENT DOCUMENTS 2738453 3/1978 Fed. Rep. of Germany ...... 285/342

Primary Examiner—Dave W. Arola
Attorney, Agent, or Firm—Allegretti, Newitt, Witcoff & McAndrews, Ltd.

[57] ABSTRACT

A coupling of the type including a flexible tube, an interiorly threaded nut member apertured to receive the tube, a cooperating exteriorly threaded nipple member, a pair of O-ring seals, and a separate tube-gripping member. The tube-gripping member includes an annular wall portion having an annular O-ring engaging end surface and a plurality of annularly spaced gripping finger portions extending axially from the end of the annular portion opposite from the annular O-ring engaging end surface. The finger portions include end surfaces engaging an interior end wall surface of the nut member, exterior segmental frustoconical surfaces converging in a direction away from the end wall engaging end surfaces engaged with a nipple member interior frustoconical surface and interior tube-engaging surfaces engaging the exterior periphery of the flexible tube and deflecting the engaged portions thereof radially inwardly a predetermined extent determined by the interengagement of a nipple member annular stop surface with a cooperating annular stop surface of the nut member. The pair of O-ring seals provides two peripheral sealing areas in series between an interior surface of the nipple member and an exterior surface of the tube.

4 Claims, 3 Drawing Figures

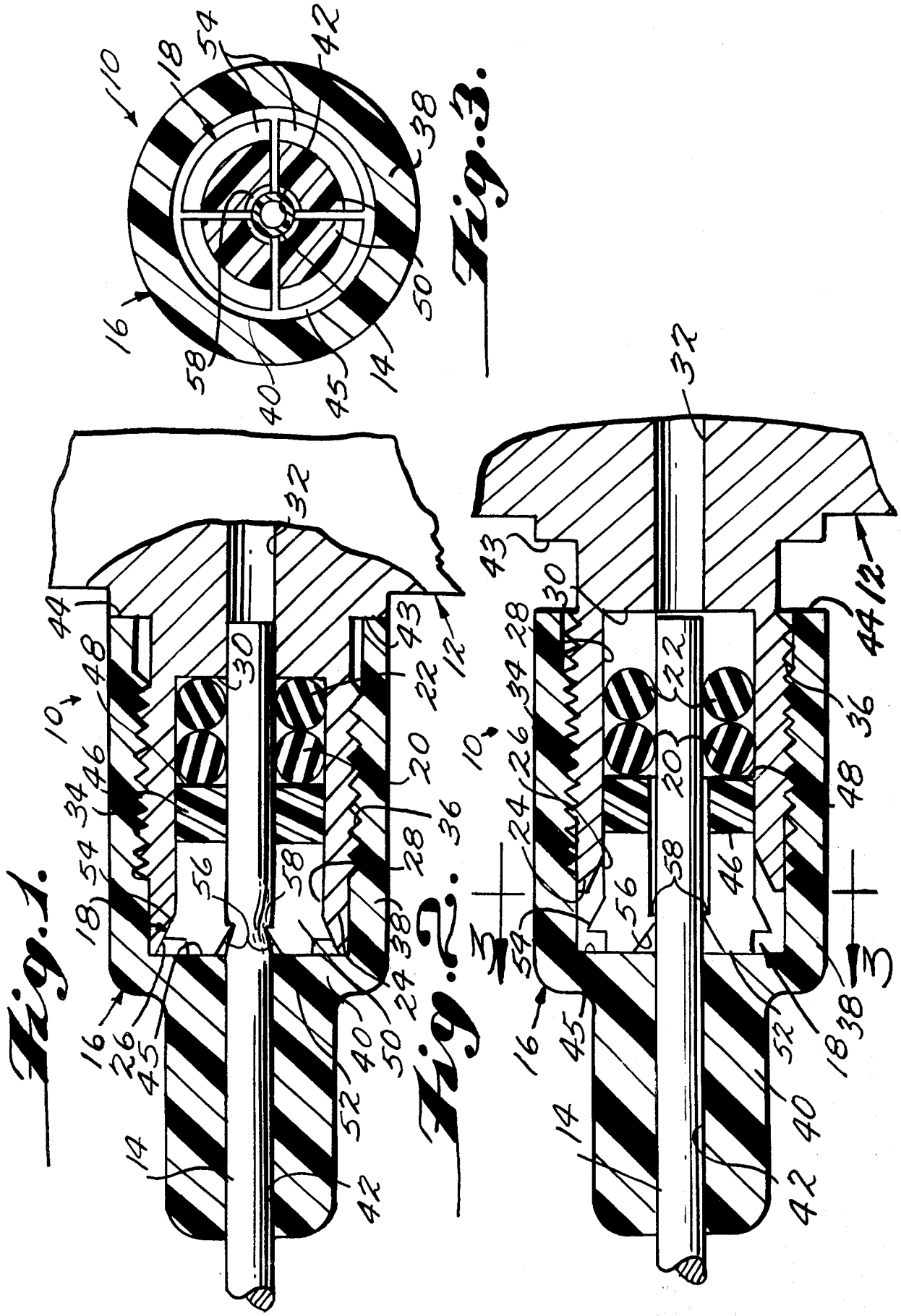

COUPLING WITH IMPROVED TUBE-GRIPPING MEMBER

This invention relates to air adjustable shock absorber systems and more particularly to improvements in the couplings utilized in operatively connecting the air lines in such systems.

An example of an air adjustable shock absorber system to which the present invention is applicable is shown in commonly assigned U.S. Pat. No. 3,193,310. This patent also discloses one embodiment of a coupling for effecting the air-tight connection between each shock absorber of the system and the various fittings of the system. In the coupling shown, the connection is effected by crimping a metal sleeve or collar over the plastic tube after having inserted an inner member within the tube. The coupling includes an outer nut member which engages the collar and is interiorly threaded to engage the exterior threads of the nipple. An annular elastomeric seal is provided in surrounding relation to the tube so as to be compressed axially between the crimped sleeve or collar and the end of the nipple during the tightening of the nut. After assembly, the inner member prevents collapse of the tube while the crimped collar provides a sufficient positive peripheral gripping action on the tube to prevent blowout under pressure. While the coupling of the patent functioned satisfactorily in operation, the sealing characteristics were improved by modifying the construction in the manner taught in subsequently issued commonly assigned U.S. Pat. No. 3,674,290. The essence of the improvement resides in the provision of a coil spring in engagement with the annular elastomeric seal for effecting the mechanical compression of the seal in lieu of the rigid end surface to end surface compression provided in the coupling of the earlier patent.

The utilization of a crimped collar for engaging the exterior periphery of the tube while establishing a highly effective gripping action necessiated the pre-assembly of the initial tube and collar on the tube by machine. The necessity to pre-assemble parts to the tube ends resulted in the further necessity of fixing the lengths of the tube sections provided for assembly. In many instances, the fixed lengths of tube sections provided were considerably in excess of the actual lengths required and hence handling of the excess lengths had to be dealt with during installation. In some instances the installer was required to coil portions of the excessive tube lengths and tape or clamp the coiled portions in position.

It has been proposed to simplify the coupling construction and reduce the costs thereof by the utilization of a one-piece molded nut member which has integrally molded therein annularly spaced gripping finger elements capable of being moved radially inwardly into engagement with the exterior periphery of the tube as the coupling is assembled. This simple approach which eliminated the need for an inner member within the tube end and a crimped outer collar was advantageous in two respects. First, since the tube did not require interior tubular inserts in the ends, tube size could be reduced. Second, since the gripping engagement to the exterior periphery of the tube was not effected until assembly of the coupling by the installer, the need to pre-assemble was obviated and hence the need to fix the length of tube sections provided. Thus, with this arrangement it became possible to provide a single length of tube which the installer could cut to suit the particular installation.

While this arrangement provides simplification in comparison with the patented couplings in the manner indicated above, there are problems presented with respect to the effective achievement of the tube gripping action. Elimination of the inner tubular member presents the possibility of tube collapse during coupling assembly and the lack of a positive mechanical crimping of a collar to the exterior periphery of the tube presents the possibility of the loosening of the gripping action in operation. In the prior art arrangement previously described this two-fold problem is attacked by instructing the installer to tighten the nut member "finger tight" only, to avoid collapse of the tube, the arrangement being such that tube collapse becomes possible by tool tightening the nut. With this arrangement it is left to the judgement of the installer just how tight "finger tight" is. Attempts to assure against blow-out by over-tightening through the use of tools will result in tube collapse and failure to tighten enough can result in the nut creeping toward a loosened condition in operation at which point tube blow-out can occur. Because of the severe conditions of vibration, heat and the like to which the coupling is subjected in normal operation of the vehicle, the provision of a positive gripping action is important for efficient long performance.

It is an object of the present invention to provide an improved coupling which obviates the disadvantges noted above with respect to the couplings of the patented prior art while maintaining the high performance level thereof. In accordance with the principles of the present invention this objective is obtained by securing the gripping function through the operation of a separate gripping member which has a predetermined effective gripping engagement with the exterior periphery of the air tube when the nut member and nipple member are threadedly engaged together into a predetermined limited makeup position. It has been found that the tendency for the prior art coupling embodying gripping fingers integral with the nut member to creep toward a loosened position is increased because of torque bias which may be imparted to the tube during makeup transmitted by the integral gripping fingers to the nut member. In many instances the installation is such that when the system is pressurized after installation the torque bias imposed upon the tube during installation is increased, thus increasing the tendency of the finger gripping elements to transfer that torque to the nut member so that the latter creeps to a loosened condition. Moreover, in normal operation the pressure conditions are constantly changing when the vehicle is in motion so that there is a cyclical application of peak pressures. By separating the nut member from the member which accomplishes the gripping function and providing for a fixed amount of gripping action when the nut member and nipple member are moved into a limiting position, the tendencies for the nut member to creep into a loosened condition under severe operating conditions imposed are materially reduced. Moreover, by providing a separate member for performing the gripping function which is separate from the nut member and hence does not directly transmit torque thereto, the initial gripping action can be achieved without a torque movement being applied to the tube and/or the gripping member. Moreover, by limiting the extent of the gripping movement tube collapse is effectively prevented during makeup and the judgement factor heretofore required in determining the extent of tightness is eliminated.

Another object of the present invention is the provision of an improved coupling which is simple in construction, economical to manufacture, easy to install and effective in operation.

These and other objects of the present invention will become more apparent during the course of the following detailed description and appended claims.

The invention may best be understood with reference to the accompanying drawings, wherein an illustrative embodiment is shown.

In the drawings:

FIG. 1 is a vertical sectional view of a coupling embodying the principles of the present invention;

FIG. 2 is a view similar to FIG. 1 showing the coupling in a position just prior to final assembly; and FIG. 3 is an enlarged sectional view taken along the line 3—3 of FIG. 2.

Referring now more particularly to the drawings, there is shown therein a coupling 10 which embodies the principles of the present invention. The coupling is particularly suited for use in an air spring shock absorber system for automotive vehicles. Systems of the type herein contemplated are shown in commonly-assigned U.S. Pat. No. 3,193,310, as well as commonly-assigned U.S. Pat. No. 3,173,671, the disclosures of both of which are hereby incorporated by reference into the present specification for background purposes.

The coupling 10 includes as one component thereof a nipple member, generally indicated at 12, which is the system may form a part of the air spring shock unit, the T fitting of the hose line system or the fill fitting of the hose line system. The coupling 10 in addition to the nipple member component 12 includes five other components, one of which is a section of flexible tube 14. Several sections of the flexible tube 14 are utilized in the system to communicate the shock absorbers to one another and to the fill valve through the T fitting. The remaining three components of the coupling 10 include a nut member, generally indicated at 16, a separate tube-gripping member, generally indicated at 18, and two O-ring seals 20 and 22.

It will be noted that the nipple member 12 includes a tubular wall 24 having an interior frusto-conical surface 26 converging inwardly from a free end thereof. The frustoconical surface leads to the outer end of an interior cylindrical surface 28, the inner end of which terminates at a shoulder 30. The nipple member includes an inner passage 32 of a size to receive therein the tube 14. Tube 14 is made of a suitable flexible material, Nylon ® being an exemplary preferred material. An exemplary tube size is ⅛" outside diameter.

The exterior periphery of the nipple member 12 is provided with exterior threads 34 which are adapted to cooperate with interior threads 36 formed on a peripheral wall 38 forming a part of the nut member 16. The nut member 16 also includes an end wall 40 extending transversely inwardly from one end of the peripheral wall 38. The end wall 40 is formed with a central aperture or opening 42 of a size to closely receive the flexible tube 14 therethrough.

The nipple member 12 and nut member 16 are provided with cooperating annular stop surfaces which are positioned so as to interengage one another when the coupling 10 is fully made up by the interengagement of the threads 34 and 36 of the nipple member and nut member respectively. In the embodiment shown the annular stop surface on the nipple member 12 is in the form of an outwardly facing annular stop surface 43 surrounding the exterior of the tubular wall 24 of the nipple member and the cooperating stop surface of the nut member 16 is constituted by the end surface 44 of the peripheral wall 38 of the nut member 16. While it is preferred to provide the interengaging stop surfaces 43 and 44 in the manner described above it will be understood that the end wall 40 of the nut member is provided with an interior outwardly facing surface 45, the exterior portion of which can provide one annular stop surface with the end surface of the tubular wall 24 of the nipple member providing the cooperating stop surface. In the embodiment shown the latter two surfaces are not utilized as the stop surfaces but rather the limiting function is provided by stop surfaces 43 and 44. It will be understood however, that the limiting function provided by the surfaces 43 and 44 may be supplemented by the other stop surfaces described above or the limiting function may be provided entirely thereby in lieu of the stop surfaces 43 and 44.

The tube-gripping member 18 includes an annular wall portion 46 having an annular O-ring engaging end surface 48. The tube-gripping member 18 also includes four annularly spaced finger portions 50 extending axially from the end of the annular portion 46 opposite from the annular O-ring engaging end surface 48. The finger portions 50 include segmental annular end surfaces 52 which are adapted to engage the interior portion of the end wall surface 45 of the nut member in operation. The finger portions 50 also include exterior segmental frustoconical surfaces 54 which commence in axially inward and radially outwardly spaced relation with respect to the end surfaces 52 and converge in a direcion away from the end surfaces 52. The annular wall portion 46 of the tube-gripping member has an exterior diameter size less than the interior diameter size of the cylindrical surface 28 of the nipple member so as to be engageable therein and the adjacent sections of the finger portions extending to the segmental frustoconical surfaces 54 are of comparable size.

The finger portions 50 also include interior segmental frustoconical surfaces 56 which converge inwardly from the inner periphery of the end surfaces 52. The inner ends of the inner segmental frustoconical surfaces 56 intersect with generally radially extending surfaces 58 which form therewith shallow tube-engaging barb structures. The inner periphery of the annular wall portion 46 is of a size sufficient to receive the flexible tube 14 therethrough and the sections of the finger portions 50 extending to the surfaces 58 are of comparable size. The radial extent of the surfaces 58 is shown in the drawings somewhat exaggerated in order to emphasize the existence of the barb structures provided therewith. An exemplary radial dimension of the surfaces 58 for use with a ⅛" O.D. tube is 0.005".

In operation, the components of the couplings are provided to the installer in unassembled condition for custom-fitting to the particular automotive vehicle to which the shock absorbers are to be mounted. It is contemplated that a single length of tube 14 would be provided and the installer would be instructed to cut off from the single length sections having lengths equal to that which would be appropriate in the particular installation as it proceeds. Each end of the tube sections thus cut would form a component of an assembled coupling 10.

Assembly is accomplished by first slipping the nut member over the end of the flexible tube 14 with the nut member oriented so that the interior end wall surface 45 faces outwardly toward the end of the tube after the nut member has been engged on the tube end. Next, the tube-gripping member 18 is fed onto the tube end oriented so that the annular end surface 48 faces toward the extremity of the tube end. Finally, the two O-ring seals 20 and 22 are fed over the flexible tube 14 so as to be disposed in side-by-side relation thereto. With the nut member 16, tube-gripping member 18 and O-ring seals 20 and 22 mounted on the tube 14, in the manner indicated above, this sub-assembly is then engaged within the tubular nipple member in the manner clearly shown in FIG. 2. It will be noted that O-ring seals 20 and 22 move into peripheral sealing engagement with the interior cylindrical surface 28 of the nipple member 12 and that the annular wall portion 46 of the tube-gripping member 18 likewise moves within the cylindrical surface 28.

Next, the interior threads 36 of the nut member 16 are engaged on the exterior threads 34 of the nipple member 12 and the nut member is turned so as to move the same longitudinally toward the nipple. During this movement, the interior end wall surface 45 of the nut member 16 engages the end surfaces 52 of the hose-gripping member so that the latter is moved inwardly with respect to the cylindrical surface as the nut member 16 is tightened on the nipple member. Continued turning of the nut member causes the frusto-conical surfaces 26 of the nipple member to be interengaged by the segmental exterior frustoconical surfaces 54 of the tube-gripping member 18. Further turning movement by virtue of the interengagement causes the finger portions 50 to be deflected or deformed radially inwardly, which movement continues until the annular end stop surface 44 of the nut member 16 engages the cooperating annular stop surface 43 of the nipple member 12. When this interengagement takes place, the coupling 10 is fully assembled and the barb structures defined by the intersection of the segmental frustoconical surfaces 56 and radial surfaces 58 dig into the adjacent periphery of the flexible tube 14 a predetermined extent, thus effectively preventing movement of the tube 14 outwardly with respect to the nipple member 12. It will also be noted that O-ring seals 20 and 22 provide two annular air-tight seals in series between the tube and the nipple member.

It is important to note that during the final turning movement of the nut member with respect to the nipple member into the interengaged position shown in FIG. 1, the tube-gripping member 18 by virtue of being separate from the nut member can be retained in a fixed rotational position with respect to the nipple member while relative rotational or turning movement with respect to the nut member 16 can take place. Thus, the interengagement of the end surfaces 52 of the finger portions with the radial surface 45 permits such relative movement and hence the torque applied to the nut member is not transmitted to the tube 14 through the tube-gripping member 18. Since no relative torque bias between the tube-gripping member 18 and tube 14 takes place during the final makeup movement of the assembly, it is possible to provide the small barb structures which dig into and effectively hold the tube against outward movement.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. An air spring shock absorber adapted for automotive vehicles incuding a shock absorber body and a pressurized flexible air line tube having a tube end portion and a tube exterior of a tube exterior diameter size, the air spring shock absorber having the improvement of an air spring shock absorber air line coupling comprising:

a rigid nipple member being formed on the shock absorber body and including a tubular wall (24) having a free end, an exterior periphery, an interior frustoconical surface (26) converging inwardly with respect to said free end, a cylindrical surface (28) extending inwardly from said frusto-conical surface being of a diameter size substantially greater than the tube exterior diameter size, exterior threads on the exterior periphery, an inner passage (32) extending inwardly of said cylindrical surface into said shock absorber body and being of a diameter size to closely receive said flexible air line tube, and a first annular stop surface facing outwardly with respect to the free end of the tubular wall;

O-ring seal means in said rigid nipple member along said cylindrical surface for exteriorly sealingly engaging said cylindrical surface and interiorly sealingly engaging the tube exterior of the flexible air line tube;

a nut member including an end wall having a central aperture therein of a diameter size to closely receive said flexible air line tube therethrough and a peripheral wall extending axially from said end wall and having an interior periphery and interior threads on the interior periphery cooperatively engaging the exterior threads of said nipple member, said nut member having a second annular stop surface cooperatively engaging the outwardly facing first annular stop surface of said nipple member;

a separate tube-gripping member in said rigid nipple member along said cylindrical surface and said frustoconical surface adjacent said O-ring means, including an annular wall portion (46) having an annular O-ring engaging end surface (48), an exterior peripheral surface of a diameter size less than the diameter size of said cylindrical surface of said nipple member and an interior peripheral surface of a diameter size to closely receive said tube, and a plurality of annularly spaced gripping finger portions (50) extending axially from the annular wall portion opposite from said annular O-ring engaging end surface, each of said finger portions including:

(i) an end wall engaging end surface (52) facing in a direction opposite from said annular O-ring engaging end surface, (ii) an exterior segmental frustoconical surface (54) converging in a direction away from said end wall engaging end surface, all within the confines of said rigid nipple member, (iii) an interior segmental frustoconical surface (56) having an inner end and coverging inwardly from said end wall engaging end surface to said inner end, all within the confines of said rigid nipple member;

(iv) an interior radially extending surface (58) extending inwardly of said interior peripheral surface; and (v) barb structure located at the inner end of said interior segmental frustoconical surface and formed by said inner end and said radially extending surface, said barb structure adapted to dig into the exterior of said flexible air line tube;

the end portion of the air line tube being positioned through the central aperture of said nut member, through the interior peripheral surface of the separate tube-gripping member, through the O-ring seal means, and into the inner passage of the rigid nipple member;

the exterior and interior frustoconical surfaces of the separate tube-gripping member and the interior frustoconical surface of said nipple member each having an angle of inclination and extent being related with respect to the annular stop surfaces of said nipple and nut member such that the latter are in engagement by virture of the cooperative interengagement of said interior and exterior threads and the frustoconical surface of said nipple member and the segmental exterior frustoconical surface of the tube-gripping member are simultaneously in interengagement to effect a predetermined radially inward deformation of said gripping finger portions to push said barb structures into digging engagement with the end portion of the flexible tube extending through said end wall aperture within the cylindrical surface such that the coupling prevents outward movement of the flexible air line tube while the tube remains pressurized from the interior of the shock absorber and while said O-ring seal means provides a pressure-tight seal between said nipple member and said flexible tube.

2. A coupling as defined in claim 1 wherein the diverging ends of said exterior segmental frustoconical surfaces terminates in axially spaced relation with respect to end wall engaging end surfaces of said finger portions.

3. A coupling as defined in claim 1 wherein said O-ring seal means comprises a pair of resilient O-ring seals arranged to be disposed in side-by-side relationship.

4. A coupling as defined in claim 1 wherein the annular stop surface of said nut member constitutes an end surface of the peripheral wall thereof opposite from said end wall.

* * * * *